(12) United States Patent
Bullis

(10) Patent No.: US 8,746,378 B2
(45) Date of Patent: *Jun. 10, 2014

(54) HIGH EFFICIENCY VEHICLE

(76) Inventor: James K. Bullis, Sunnyvale, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/807,598

(22) Filed: Sep. 9, 2010

(65) Prior Publication Data

US 2011/0000723 A1    Jan. 6, 2011

Related U.S. Application Data

(63) Continuation of application No. 11/893,497, filed on Aug. 16, 2007, now Pat. No. 7,950,479.

(51) Int. Cl.
*B62D 61/10* (2006.01)

(52) U.S. Cl.
USPC ............ 180/24.1; 180/14.1; 180/22; 180/23; 180/24.07; 280/419; 244/24; 244/50; 244/99.2

(58) Field of Classification Search
USPC ........... 180/14.1, 22, 23, 24.01, 24.07, 24.12, 180/212; 280/419; 244/24, 50, 99.2
See application file for complete search history.

(56) References Cited

U.S. PATENT DOCUMENTS

| | | | | |
|---|---|---|---|---|
| 4,042,053 A * | 8/1977 | Sieren et al. | ................... | 180/236 |
| 4,537,373 A * | 8/1985 | Butts | ............................... | 244/22 |
| 4,579,297 A * | 4/1986 | Ayoola | ............................. | 244/2 |
| 5,984,228 A * | 11/1999 | Pham | ............................... | 244/2 |
| 6,886,776 B2 * | 5/2005 | Wagner et al. | ............... | 244/12.4 |
| 6,974,105 B2 * | 12/2005 | Pham | ............................... | 244/6 |
| 2003/0062443 A1 * | 4/2003 | Wagner et al. | ............... | 244/12.3 |
| 2005/0045762 A1 * | 3/2005 | Pham | ........................... | 244/7 R |

* cited by examiner

Primary Examiner — Toan To

(57) ABSTRACT

Here invented are efficient road vehicles having special aerodynamic shapes, with stabilizing provisions that enable aerodynamic efficiency. It is a vehicle that is configured to include a carriage part that encloses a driver and passenger riding in tandem. This car width is for persons seated in single file, enabling a narrow width that makes a body shaped like an airship practical, where that shape is characterized by a very low drag coefficient in free flow conditions. This body is elevated on struts above a wheel system to enable such free flow aerodynamic conditions, thus, the drag coefficient of the airship is made applicable to this road vehicle. The wheel system includes wheels on each side of the vehicle that are arranged in horizontal columns, to which the struts are attached. The horizontal columns act as individual aerodynamic entities that function independently of the carriage aerodynamic operation. Because this car has both low frontal area and low drag coefficient it will require minimal energy for high speed operation.

23 Claims, 4 Drawing Sheets

HIGH EFFICIENCY VEHICLE

CROSS-REFERENCE TO RELATED APPLICATION

This is Continuation Application of U.S. Ser. No. 11/893,497 filed Aug. 16, 2007 now U.S. Pat. No. 7,950,479.

This patent document contains material that is subject to copyright protection. Facsimile reproduction is allowed of the patent document or the patent disclosure as it appears in the Patent and Trademark Office patent file or records as allowed by US patent Llw, but otherwise all copyright rights are reserved.

BACKGROUND OF THE INVENTION

1. Field of the Invention

This present invention relates to motor vehicles.

2. Description of the Prior Art

Aerodynamic efficiency is a high priority in design of air vehicles. In design of automobiles it ranks below a list of requirement that conflict with efficiency, some of which are rarely questioned. Such are requirements for two front seats, ease of implementation, and fashion conformity. When energy is inexpensive and inexhaustible, such requirements are not a problem. Technological innovations, for example electric drive systems capable of regenerative braking, are interesting curiosities. Adequate motivation for significant innovation is lacking and key decision makers need have no understanding of innovative possibilities. Thus, when the energy equation is significantly changed, the world wide motor vehicle industry is ill equipped to adapt effectively. In such a world, minor improvements pass for important progress. Useful principles, if not completely forgotten, are poorly understood.

A basic concept in aerodynamics is that of drag coefficient. At any given speed the actual drag force is proportional to the product of projected frontal area and the drag coefficient value. While the drag coefficient value is a function of Reynolds number, for vehicle sizes and speeds of interest that drag coefficient value is reasonably constant. An effort to reduce the width of cars by eliminating the right front seat, as in Bullis, application Ser. No. 11/064,301, Feb. 23, 2005 accomplished a significant reduction in projected frontal area. Further aerodynamic drag force reduction depends on reduction of drag coefficient.

The ideal airship shape is available from the history of aerodynamic research. Prior to developing the modern airplane wing shape, Prandtl and his students at his Gottingen University laboratory in Germany, with cooperating American researchers, studied the aerodynamics of airships. Such vehicles were of great interest in 1906, their use continuing through WWII. A typical airship shape was developed that was roughly a cylinder with tapered ends, this being a body of revolution about an axis aligned with the flight direction. Prandtl showed that drag force due to accelerative effects could be almost eliminated by a refined taper function. Only a small viscous drag then remains. Wind tunnel test results are available that can be scaled to dimensions appropriate for the automobile. In spite of this background, very little of this technology has been used in the design of road vehicle.

It appears that a large impediment to progress in this regard is the nearly universal requirement for seating arrangements that include, at least, two front seats. Therefore, to enclose two adults seated in such front seats in a body of revolution requires that such a body be about six feet in diameter. Thus, the attempt in the 1930 era to utilize the airship resulted in a car known as the Dymaxion. This example is said to have achieved improved gas mileage for its day, but nothing like what might be expected for a body of revolution somewhat similar to the ideal airship known to Prandtl. A significant difference was that it was not significantly elevated above the ground. Given that stability of this vehicle was a concern, that limitation seems inescapable.

The kind of thinking ingrained in the process of automobile design is illustrated in a Mercedes Benz press release that discusses development of an automobile based on a nearly ideal aerodynamic body form. They utilized the shape of an unusual looking fish known as the box-fish known for low hydrodynamic drag. The initial test model was shaped like that fish and wind tunnel tests showed it to be subject to extremely low air drag. It is not noted in the release, but having width approximately equal to height means that this functions much like a body of revolution. They do discuss the effect of testing at a significant separation distance from the ground, such that free flow aerodynamic conditions are maintained. While they measured extremely low drag in free flow conditions, when more realistic conditions were represented, by testing in proximity to the ground, they suffered a 50% penalty in drag coefficient. They further indicate that adding other features necessary for a realistic car, as well as the provision for operation close to the ground, causes a degradation of drag resistance of more than 200% relative to the ideal body test results in free flow conditions. Such features included wheel wells that provide for wheel steering and suspension devices. The inability of these experts to achieve better results can be attributed to their ground rule, as stated by the press release, that the vehicle width required for seating two persons was six feet. Apparently, a single wide car is inconceivable, at least for major production auto makers. Thus, they are barred from realization of the accumulating advantages of such an arrangement, where a reduction in projected frontal area, closer adherence to the ideal shape, and practicality of elevating such a shape are realizable measures to improve efficiency. The wide form naturally leads to a flat bottomed form which further exacerbates the degradation in drag coefficient caused by proximity to the ground. While this development effort achieved a significant improvement in aerodynamic efficiency, it came far short of the level of performance originally suggested by the box-fish ideal shape. This development process thus illustrates the requirements and assumptions that are a basic part of the present day automotive design process.

A practical rule for achieving an approximation of free flow conditions can be postulated based on a ground separation requirement related to the frontal projected area, where this rule stipulates an elevation sufficient for achieving a significant practical performance advantage. For bodies of revolution and for rectangular shapes having width greater than height, an approximate elevation standard is one half of the square root of the projected frontal area. Applying this rule to a six foot wide body of revolution car, where two people can ride side-by-side, leads to an overall car height of over eight feet. This would obviously not appeal to car designers.

It might be supposed that a narrow car would have been considered by the Mercedes-Benz project team that worked on the box fish shape, were a practical way to stabilize such a car available. The previous invention that might have been useful in this concept work, U.S. Pat. No. 7,338,061 Bullis 2008, was not available at that time.

Faced with these realities, the nearly universal choice has been to give up on the ideal body form and any attempt at elevation. In fact, most designs go in the opposite direction.

Efforts to make cars economical usually result in a very low vehicle body height that is spaced as close as possible to the ground. The designs usually direct air flow over, and to the sides of, the car. At least this ends up with low and wide car that is naturally stable. The obvious drawback of significantly uncomfortable seating and unpleasant height of eye has never been widely accepted by car buyers. The automotive industry has, thus, failed to show a development path capable of addressing present fuel efficiency concerns.

An exception is suggested by a developmental vehicle called the Aptera, which appears to the published description to be a very lightweight vehicle, probably less than a large motorcycle; with an extremely wide wheel base, apparently about as wide as that of a large truck. This is reported to be an aerodynamic shape designed by an optimizing, finite element computer code, where the coefficient of drag seems to be nearly ideal. Inspection of the published information seems to show a ground clearance that allows some increase of air flow under the vehicle, compared to typical cars. This ground clearance, together with the body shape, appears to be working to minimize ground surface effect, whether or not this was an intention of the designers or a determination made by the optimizing computer code. The vehicle is still very low overall, and this appears to be at the expense of rider comfort, where two adults are said to be riding side by side, with very little headroom. Since there is no provision for stabilization beyond weight in the vehicle body and the wide wheel base, it is important that the overall height be as low as possible. Given that it carries two adults side by side, this vehicle is a remarkable achievement in aerodynamic design. It shows the potential for shape refinement of the finite element method.

There have been some attempts to produce a narrow car with seating width for only one person. The Stanley Steamer race car of 1885 was for a single person and it was built with some meaningful consideration of aerodynamic performance. However, its open cockpit and exposed driver prevented most of the intended low drag effect. The cycle cars of the 1910 era were also narrow, but aerodynamic shape was not a significant part of these designs. Cars were produced in the 1950 era with single wide seating, such as the Messerschmitt, which also was very carefully shaped for aerodynamic effect, but this also was very low to the ground. Designing a car with an elevated body on a conventional wheel base would require addition of significant, low placed weight to achieve a stable vehicle. However, gas mileage goals have always tended to encourage car designs that were light weight, especially where the usual propulsion machinery had no capability to recapture kinetic energy by use of regenerative braking. Rolling resistance due to friction in tires and drive train apparatus further discourages heavy vehicles. Consequently, there could be little incentive in the past to create a car having an elevated body.

A high and narrow vehicle, where persons were seated singly or in tandem, was discussed in Bullis, application Ser. No. 11/064,301, Feb. 23, 2005 (hereby incorporated by reference). That invention focused on providing a method of stabilizing such a vehicle using an articulated vehicle arrangement that was a two frame system, having a stabilizer part that was connected to a carriage part with a two axis articulated joint. A streamlined version was also included in this disclosure. A body is said to be streamlined where that body has a controlled contour where stream line convergence is fairly rapid and stream line divergence is very gradual, where a stream line is an imaginary line which is, at the instant of observation, tangent to the velocity vector at every point through which it passes. However, in this arrangement it was necessary for the stabilizer rear wheels to pass under the carriage part and the necessary clearance for this was increased by the need for carriage pitch hinging action. This meant a trade-off had to be made between overall vehicle height and a desire for an uninterrupted aerodynamic carriage surface. It was also necessary for the forward part of the carriage to allow clearance for pitching. This limited shaping possibilities. Further, this disclosure did not provide for an aerodynamic carriage entity that operated independently of the stabilizer part. Neither did it provide for an aerodynamically integrated carriage and stabilizer. Also, this prior disclosure showed the streamlined version as vertically elongated, with its lowest point raised above the ground only high enough to give reasonable clearance of uneven surfaces, with no provision for air flow under the vehicle.

With these limitations, the degree of aerodynamic refinement represented in that prior disclosure was not clearly superior to that of conventional automobiles. Thus the fuel economy improvement was based only on the greatly reduced width. Almost doubling of gas mileage was expected. Although widespread public acceptance of this breakthrough requires rearrangement of the way people sit in cars, this expected improvement in gas mileage is expected to strongly motivate such changes.

However, there remains strong motivation for even further improvement. It is reasonable to expect that the entire world population will increasingly insist on participating in a life style that includes the ability to move about quickly, safely, and comfortably. As life styles are transformed, energy conservation, pollution, and global warming problems will be exacerbated. A major part of the solution to these problems could be a large reduction in the amount of energy needed for transportation. While it is well known that public transportation holds promise in that regard, it is clear that most people prefer distributed living that tends to be inconsistent with practical public transportation systems. It is here assumed that a solution that preserves the fast personal car, with its associated time efficiency and flexibility, will be much more readily accepted.

SUMMARY OF THE INVENTION

Here disclosed are efficicient road vehicles having special aerodynamic shapes, with stabilizing wheel arrangements that enable aerodynamic efficiency. It is a car that is tall and narrow that includes two parts.

An upper part is a carriage part that encloses a driver and passenger riding in tandem. This car is only wide enough for persons seated in single file, so it has very low projected frontal area compared with typical cars. Further, the narrow width means that a body shaped like an airship can be used. That shape is characterized by a very low drag coefficient in free flow conditions.

This body is elevated on struts to enable such free flow aerodynamic conditions, so the drag coefficient of the airship is made applicable to this road vehicle. Thus achieved is a car having both low frontal area and low drag coefficient that will require minimal energy for high speed operation.

The struts connect to a lower part of the vehicle that includes low profile wheel trains on each side of the vehicle. The wheel trains are horizontal columns that include equipment and wheels, enclosed with fairing surfaces and made aerodynamically smooth with special fairing devices. The weight and spacing between the wheel trains provides stabilization that is essential for road operation of this narrow car. To provide sufficient stabilization the spacing between wheel trains is adjustable for particular applications, though efforts to minimize this spacing are desired to enhance utility of the vehicle.

Because of this arrangement, the carriage and each of the wheel trains act approximately as isolated aerodynamic entities.

Operation is comparable to known road vehicles; whether the front wheels provide the steering action or the rear wheels do this function, or both.

DETAILED DESCRIPTION

Figure 1:
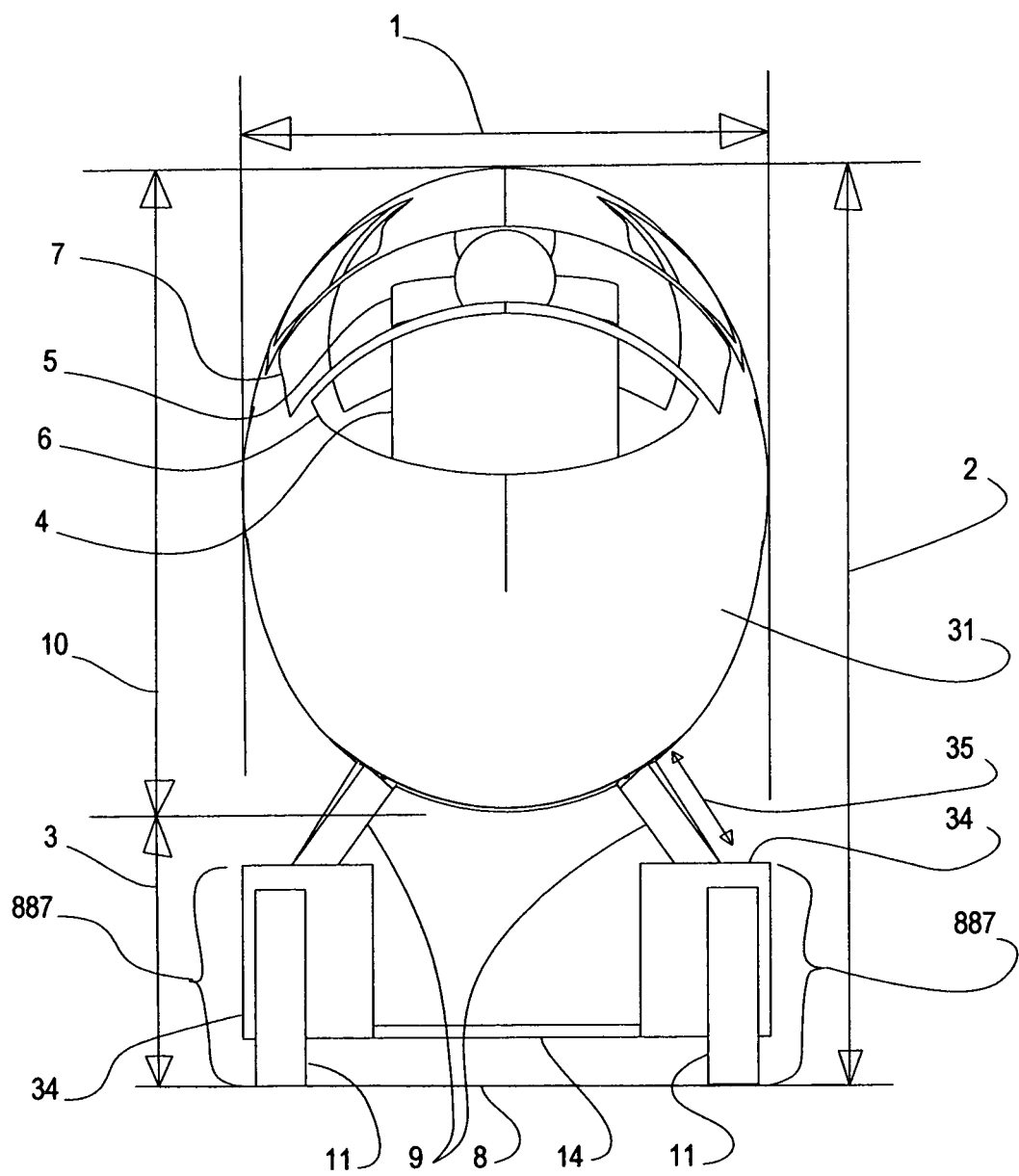
FIG. 1 Frontal view of an elevated airship held on struts attached to wheel trains for free flow operation, where airship body and wheel trains are configured to act as independent aerodynamic entities.

This invention offers a way to greatly reduce the amount of fuel needed for personal road transportation. For the most part, this fuel comes from burning hydrocarbons, whether they are oil derived or coal. While there are potential efficiency advantages, use of electrical energy does not significantly change this, since use of energy in this form only means that the fuel is burned at some distant site. Thus, the appropriate objective is to simply reduce the amount of energy needed. It should also be framed in terms of reducing the amount of energy needed to transport one person a distance of one mile. It must also satisfy the need for rapid transportation, given that time sitting in a car is a negative measure of effectiveness in transportation.

The present invention is designed to greatly cut energy usage and it is particularly effective for high speed automotive operation. While commercial acceptance will depend on people changing the way they drive and ride in cars, incentives promised by this new vehicle type include continuation of the high speed mobility to which people are accustomed, where that life style is threatened by energy shortages, pollution, and global warming issues. Furthermore, the driver is provided with a commanding view of the road, enabling superior driving compared to other possible efficient vehicles. Improvements in safety and comfort are also envisioned. Still further, more cars can move on the road and more can be parked in a given sized parking lot. Inexpensive construction is also planned. A profound world-wide impact is envisioned.

The invention adapts airship research to the automotive field. Special stabilization features are incorporated to produce a practical car that is free of most of the air drag force that is a major cause of automobile inefficiency. This new car has both a very low air drag coefficient and a low projected frontal area. Because the force caused by air drag, at any given speed, is proportional to a product of that projected frontal area and that drag coefficient, the resulting air drag force is less than a fourth that of the typical car. Although this is most important at highway speeds, with other efficiency measures such as electric wheel drive that eliminates much of the typical drive train machinery, hybrid propulsion system with regenerative braking, and low friction loss tires, overall gas mileage up to about 200 miles per gallon is expected.

This new car is a stabilized, narrow vehicle, having an upper carriage part that is just wide enough to seat large adults in single file. This alone accomplishes a reduction of projected frontal area to about half that of a typical car. Further, that narrow seating arrangement makes it practical to enclose the seated adults in an aerodynamic body shape known to have a very low drag coefficient. Such an ideal body is approximately a body of revolution, or another shape that produces a radially symmetric air flow pattern around it approximately like that produced by a body of revolution. The body of revolution has a body axis that is a fixed line length that is about the same as the vehicle length. This axis is approximately aligned with the vehicle straight travel direction. The body of revolution is constructed by revolving a curve constructed on a plane, where that curve connects to both ends of the body axis. Where the curve is highly optimized for aerodynamic purposes, this produces a highly optimized body shape.

Finally, the narrow form makes it feasible to support this body shape in an elevated position, thus providing free flow aerodynamic conditions that make its very low drag coefficient effective in a road vehicle. Not only can the body of revolution be implemented in a well known, ideal airship shape, but the radially symmetric air flow pattern better enables spreading to the sides compared to flat bottomed shapes, so the required elevation is reduced. Even though the elevation is minimized, the vehicle is still unusually tall and narrow. Stabilizing such a car requires more than conventional automotive methods.

Airship research carried out in the 1920 era provides a high performance aerodynamic body shape that is here used as a carriage to enclose persons riding in the automobile. Wind tunnel tests were carried out in those years producing air drag force measurement data that can be used to design this high efficiency automobile. This data is especially complete for the Akron-Zeppelin shape, even including drag force data for the model at a variety of pitch angles. For vehicle speeds of interest the drag coefficient can be reasonably estimated from this data for scaled models of this shape.

However, the wind tunnel tests were arranged to provide numbers applicable to high altitude flight. While such numbers are applicable for airship operation, ground operation involves a flat surface that disturbs free flow aerodynamic conditions. The effective drag coefficient is substantially increased. Thus, it is important to allow as much room under the carriage for air flow, relative to the carriage, as possible. Although an ideal height is greater than would be possible, an effective approximation to free flow conditions at a highway speed is expected for an elevation equal to half the square root of the projected frontal area. The preferred embodiment is held slightly higher than this rule dictates. This rule is only very rough guidance, which is not intended to be a limitation. It is anticipated that shape refinement will enable tuning of the highway speed that is ideal and extending somewhat the most effective speed range. Obviously, the elevated, nearly ideal body will represent an unusual looking, tall and narrow vehicle.

This shape is well suited for enclosing large people sitting in single file and providing adequate viewing angles, especially when pitched down about ten degrees.

Having arranged for the carriage to have extremely low air drag, the air drag of the lower frame, including the wheels, becomes significant. An arrangement that provides additional stability, while optimizing the aerodynamic shape of the lower frames, arranges lower frame structural parts, heavy equipment, and wheels in low profile, thin horizontal columns. This is an ideal location for vehicle weight, and it is particularly well suited for holding electrical batteries. Flat motors fit within these columns. These stabilizing effects are important to counter cross wind effects and tilted road surfaces, as well as providing sufficient stability for turning operations. Each such column is enclosed in a covering surface that produces a smooth surfaced, elongated aerodynamic unit that operates like a train. Such a wheel train operates as a unit on each side of the vehicle, and an air flow passage is enabled between the trains. Each wheel train includes fairing devices for wheels, to enable operation as an aerodynamic unit for straight line travel; however it would be interrupted for turning and other flexing actions as with spring suspension apparatus.

Compared to flat side surfaces of typical cars, the generally cylindrical shape of the carriage provides a significantly reduced drag coefficient in regard to lateral air flow, thus significantly reducing cross wind force effects. This is more of an issue where the axis of the carriage is held with at a small downward pitch angle relative to the horizontal to enhance viewing and headroom because this increases the height of the carriage at the rear. This increased height at the rear increases the lever arm of cross wind force, but this can be tolerated because of the low drag coefficient for a cylindrical form.

FIG. 1 shows a frontal view of an elevated airship form. The carriage 31 is the upper part of the vehicle. The width 1 of the carriage and overall height 2 of this tall and narrow vehicle are indicated. The height extent of the carriage alone 10 is measured as the height of the projected frontal area of such carriage. Elevation 3 above the road surface 8 is also shown. Place holders for a driver 4 and a passenger 5 are shown riding in tandem, as viewed through lower front window 6 and upper front window 7. Struts 9 attach to wheel trains 34 to hold the carriage 31 well above the road surface and to separate the carriage 31 from the wheel trains 34. The low profile wheel trains 34 are seen in frontal view, with front wheels 11 shown schematically, without enclosures, suspension apparatus, or drive train provision; these being variable in selection in the detailed design phase by persons in the art. The airfoil shaped, front cross beam 14 is a thin horizontal panel that spans between the wheel trains 34, and provides frame rigidity.

The key performance feature, low aerodynamic drag force, is largely determined by the projected frontal area, which is the outline area of the carriage 31 as shown in this view, in combination with the very low drag coefficient of the airship body form.

Wheel trains are low profile bodies that minimize their effect as separate aerodynamic entities. Each wheel train is a combination of wheels and motors in enclosures, and battery compartments, all arranged in a horizontal column. These are held separate from the carriage by struts. The weight distribution inherent in the wheel train arrangement, including positioning of heavy equipment in these low profile bodies, provides low center of gravity for stabilization purposes. Mechanical dynamic effects that stabilize against transient side forces are especially enhanced by the weight distribution.

Figure 2:
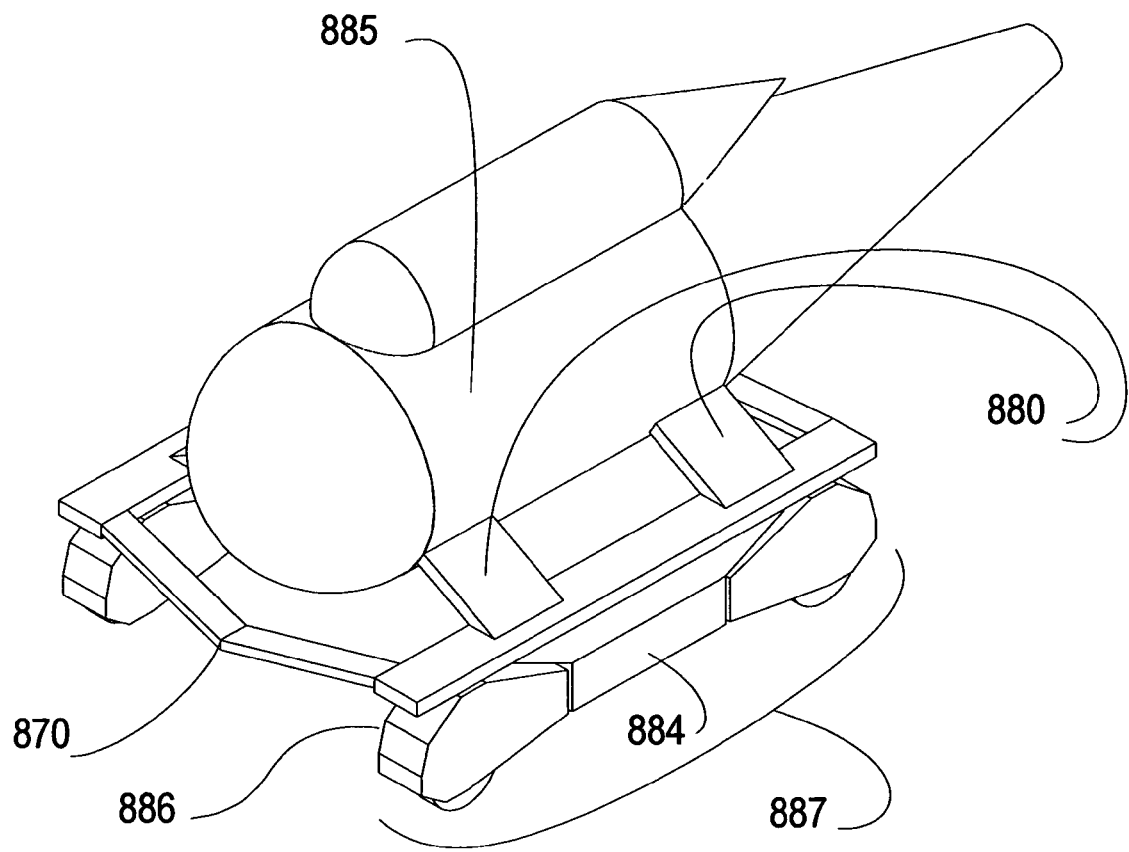
FIG. 2 Narrow aerodynamic body of revolution on widely spaced wheel trains.

In this invention the spacing between wheel trains is not constrained, such that these wheel trains can be positioned as far apart as necessary to achieve adequate stability. FIG. 2 shows wheel trains giving the overall vehicle a width greater than the main body. Here the aerodynamic differs from the refined body of revolution 31 shown approximately as the ideal airship in FIG. 1; instead the body 885 shown here is a generic form made by assembling simple solid geometric shapes.

The single wide seating arrangement is key to making this a highly efficient aerodynamic vehicle. Other possible body shapes are also envisioned, such including the box fish shape or specially refined shapes that are possibilities arising from computer optimization. Note that the struts 880 are shown as rectangular shapes, this is only for drawing simplicity, and actual implementation will benefit from airfoil shapes. Computer optimization of the body will ultimately provide a unified design that includes strut effects as part of the body system.

The wheel base is fixed, much like that in conventional automobiles. Stabilizing properties of the wheel train arrangement were found to be so substantial as to enable this simple high efficiency vehicle, where the narrow part of the automobile is only the carriage. By simply spreading the simpler wheel trains 887 to widen the wheel base, adequate stabilization can be achieved. This is now a four wheel system, where turning only requires pivoting of the front two wheels as with typical cars. Simple wheel trains can be implemented, where each wheel train includes only two wheels with heavy equipment between these two wheels. Fairings similarly provide a smooth aerodynamic surface for straight line travel, but are only needed to enable the pivoting for turning of the front wheels and flexing due to spring suspension of wheels. Now there are two thin struts on each side of the vehicle that serve to elevate the carriage with simpler structural requirements. Not only does the wheel train system provide roll stabilization for steady state forces, it is a weight distribution arrangement that maximizes moment of inertia about the longitudinal axis, thereby limiting the effect of transient forces. A brace 870 between the wheel trains provides structural advantages that put less stress on the struts 880. Wheel trains here shown 887 include a wheel enclosure 886 providing faired surfaces around wheels and equipment 884 interspersed between wheels.

Figure 3:
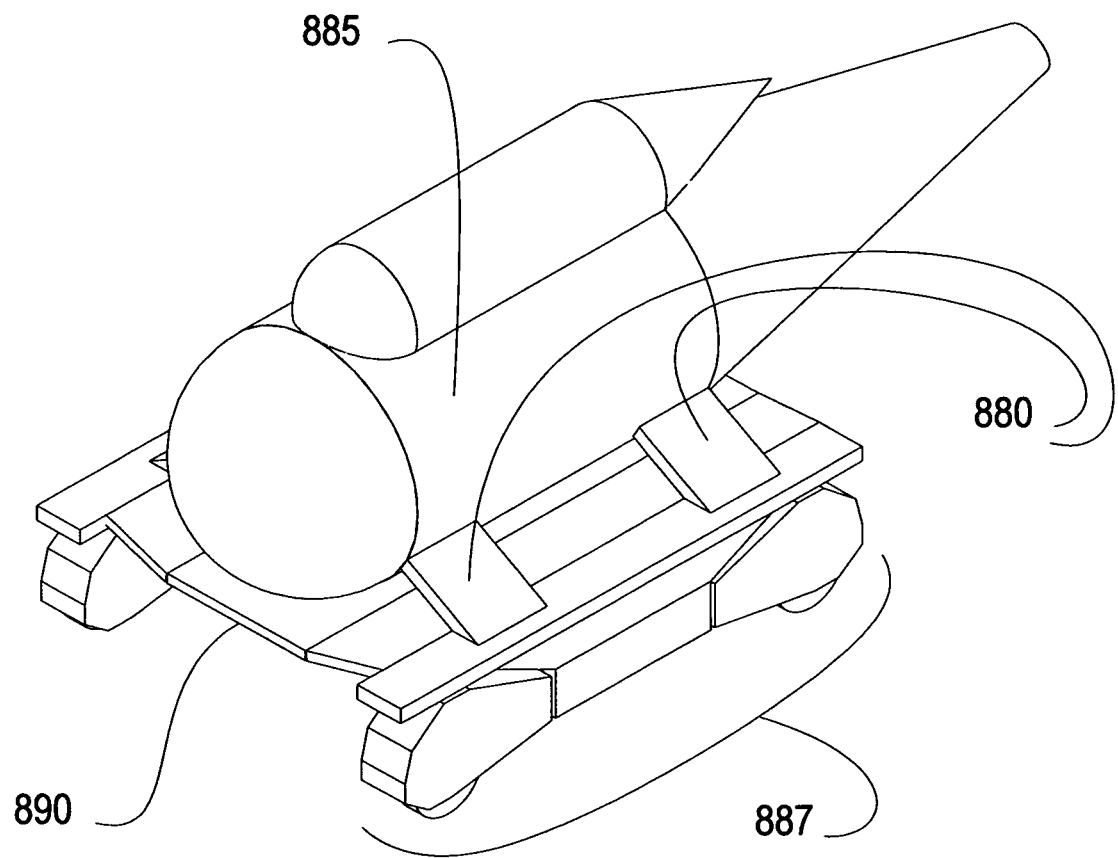
FIG. 3 High efficiency pickup truck.

FIG. 3 shows a pickup truck variation. Here a large flat panel 890, of airfoil shape, spans between the wheel trains and similarly helps structurally brace the vehicle. This panel also enables a load carrying function, as with a pickup truck, except the load is carried under the vehicle. Though somewhat degraded if a load is carried, aerodynamic efficiency of this embodiment is also exceptional.

Figure 4:
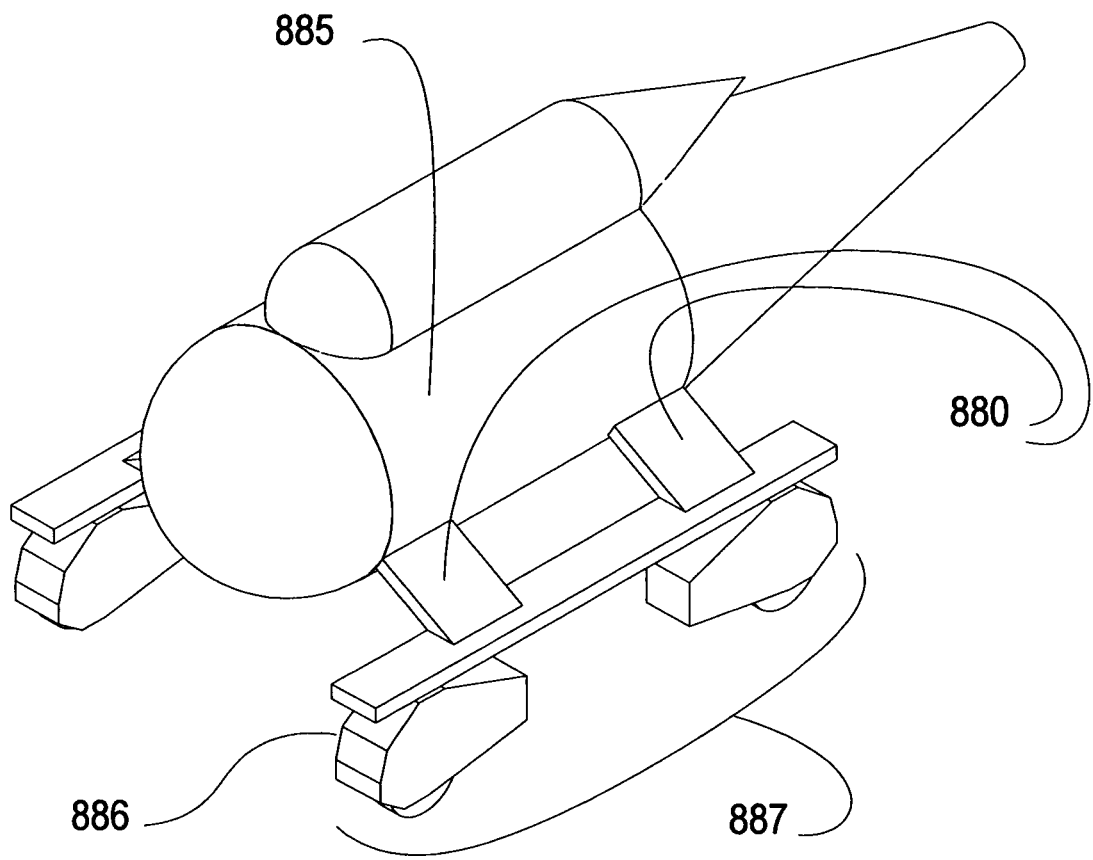
FIG. 4 Simple wheel trains, wide spacing, without equipment between wheel fairings.

FIG. 4 shows the vehicle of FIG. 2 except the struts 880 are relied on for strength and the wheels in enclosures 886 form in line wheel trains 887 without the interspersed equipment 884 shown in that FIG. 2.

This invention is potentially an inexpensive, but very efficient aerodynamic vehicle.

RAMIFICATIONS

Early on, an elevated body of revolution was selected, with the expectation that an electric car was within the range of possibility, where good aerodynamics would directly impact the operating range of such a car on a single charge. A simplified shape was first used that was convenient to draw in three dimensions, which is a combination of a sphere, a cylinder, and a cone on a common axis, with the sphere being the leading part as the vehicle travels forward.

It was then found that the wheels on each side could be aligned with electrical equipment, including heavy batteries, in a low profile, horizontal column. This was called a wheel train to suggest its similarities to a streamlined railroad train. To realize the full effect of the wheel train, the wheels on each side needed to be included, so the need for a smooth joint with a surface fairing device was noted.

Then it was realized that simple vehicle could depend on the stabilizing effect of heavy wheel trains spread to give a wheel base width like a typical car.

Then the airship research historical records were found. Analysis of the test results for the airships showed that these shapes represented an important building block, where aerodynamic drag could be meaningfully predicted. Further study then supported the idea that an achievable separation distance between the airship-shaped carriage and the road surface would enable aerodynamic drag performance reasonably close to results obtained by scaling the airship measurements.

Many refinements are envisioned. Back wheel turning is also envisioned to aid in parking, reduce turning radius, and aid in general backing operation. Rolling resistance of tires is an ultimate issue, and it is known that large diameter tires offer some advantage. Also envisioned is tuning of the vehicle shape somewhat like tuning of a sailboat shape to compensate for its fixed keel. Tuning also has a potential benefit in minimizing what remains of the roadway surface effect as far as distortion of the free flow aerodynamic pattern. It is known that airspeed close to an aerodynamic body is about that of the body, but tapers off as a function of separation distance. This tapering is very slow at low vehicle speeds, it more rapidly reverts to the surrounding environment air speed at higher vehicle speeds, and at yet higher vehicle speeds, it actually goes negative before reverting to the surrounding environment air speed. Because of this there is a potential opportunity for special shape tuning to set the taper function for the most useful speeds. Active tuning, where a shaping surface is adjusted as a function of speed, is a further possibility.

The use of wheel shells to eliminate the wheel well will be very important. It is notable that the wheel wells are a major source of air drag on conventional cars and trucks.

This description of the preferred has provided illustrations of the high efficiency, vehicle. As such it demonstrates a concept that is expected to have many variations. The appended claims should determine the scope of this invention, rather than the examples given.

I claim:

1. A vehicle for operation on a roadway, that includes,
a carriage that is an enclosure having an external shape that minimizes aerodynamic drag force in free flow conditions,
parallel, separated, wheel trains that are horizontal columns that are low profile arrangements of equipment and wheels, with supporting wheel train structure, and enclosures that provide faired surfaces, where said low profile arrangements minimize projected frontal area of said horizontal columns,
and struts that are structurally attached to said wheel train structure and said carriage so as to elevate said carriage to provide substantial separation space between said carriage and said roadway,
where operations include,
motor vehicle operation, where wide separation and low placed weight of wheel trains prevents rollover of said vehicle,
and aerodynamic operation where displaced air flows through said substantial separation space such that an overall pattern of airflow that approximates an airflow pattern that would occur were there no surfaces in proximity to affect air flow patterns, where said separation space thus minimizes aerodynamic drag force on said carriage.

2. A vehicle according to claim 1, where said wheel trains minimize aerodynamic drag of wheels.

3. A vehicle according to claim 1, where said carriage is a narrow carriage, having a width that is only wide enough for a single wide seating arrangement but is wide enough for safe and comfortable personal transportation.

4. A vehicle according to claim 1, that includes an electric drive system where batteries and electric motors are enclosed in said wheel trains.

5. A vehicle according to claim 1, where a horizontal airfoil connects between said wheel trains to enforce structural rigidity and serve also as a load carrying platform enabling operation of said vehicle as a pickup truck.

6. A vehicle according to claim 1, where said free airflow pattern for aerodynamic operation of said narrow carriage includes substantial airflow displacement and a significant amount of displaced airflow passes under said narrow vehicle, and said narrow vehicle includes struts that connect between said narrow carriage and structure to which wheels are attached, where said struts hold said narrow carriage at a substantial height above said roadway, where said substantial height enables air flow under said carriage to approximate said free flow aerodynamic operation.

7. A vehicle according to claim 1, where said wheel trains are formed as aerodynamic entities that include wheels that are in line on each side with interspersed equipment and structure, where said wheel trains include aerodynamic fairing provisions that provide for approximately continuous outer surfaces, where said struts hold said narrow carriage at a substantial height above said roadway, where said substantial height enables air flow under said carriage to approximate said free flow aerodynamic operation.

8. A vehicle according to claim 1 where said carriage has a height and a width where said height and said width are approximately equal.

9. A vehicle according to claim 1 where said narrow carriage has a height and a width, where said height is substantially greater than said width.

10. A vehicle according to claim 1 where said carriage is shaped similarly to an airship.

11. A vehicle according to claim 1, where a seating arrangement is provided that is single wide, where said vehicle is not wider than necessary to provide such said seating arrangement.

12. A vehicle according to claim 1 where said carriage is a body of revolution having a longitudinal axis approximately aligned with travel direction of said vehicle.

13. A vehicle according to claim 1 where said carriage is a body of revolution having a longitudinal axis approximately aligned with travel direction of said vehicle, except said longitudinal axis is at a pitch angle where said vehicle is pitched at a downward angle.

14. A vehicle according to claim 1 where said narrow carriage is a tapered cylindrical shape that presents a low drag coefficient to high velocity cross winds.

15. A vehicle for operation on a roadway, that includes
an aerodynamic body having a shape that is designed to minimize aerodynamic drag force for operation in free flow aerodynamic conditions, where free flow aerodynamic conditions are characterized by a free flow airflow pattern that would occur for said aerodynamic body in absence of any other surface that would affect said airflow pattern,
where said aerodynamic body is attached to wheel apparatus with struts, where said struts provide separation between said aerodynamic body and said wheel apparatus, and said struts provide separation between said aerodynamic body and said roadway,
and a weight distribution providing a low center of gravity, where said wheel apparatus enables said aerodynamic body to travel on a roadway, where said weight distribution enables stability, where said struts provide support to said aerodynamic body and enable said wheel apparatus and said aerodynamic body to function as separate aerodynamic entities, where said struts provide adequate separation of said entities to enable roadway operation where aerodynamic effects of said wheel apparatus have a minimal effect on said free flow airflow pattern, and where said struts provide adequate separation of said aerodynamic body from said roadway such that said roadway has a minimal effect on said free flow airflow pattern.

16. A vehicle according to claim 15 that is configured with a surface for carrying loads that is attached to said wheel apparatus to enable said vehicle to function as a pickup truck.

17. A vehicle according to claim 15 that is configured with a surface for carrying loads to enable said vehicle to function as a pickup truck, where said aerodynamic body is a narrow body that provides a width that is no greater than needed to enable a single wide seating arrangement.

18. A vehicle according to claim 15, where said aerodynamic body is configured for a single wide seating arrangement.

19. A vehicle according to claim 15, where said aerodynamic body has a shape that is a body of revolution.

20. A vehicle according to claim 15, where said aerodynamic body has a shape that is a body of revolution, and said vehicle is configured on struts that serve to elevate said aerodynamic body such that significant displaced air flows under said aerodynamic body to enable said aerodynamic airflow pattern that approximates said free flow airflow pattern.

21. A vehicle according to claim 15, where said aerodynamic body has a shape approximately similar to that of an airship that operates similarly to the Akron-Zeppelin airship.

22. A vehicle according to claim 15 where said wheel apparatus is arranged as wheel trains on each side of said vehicle, where said wheel trains function as said separate aerodynamic entities, where said wheel trains include wheels arranged in line that is direction of travel.

23. A vehicle according to claim 15 where said wheel apparatus is arranged as wheel trains on each side of said vehicle, where said wheel trains function as said separate aerodynamic entities, where said wheel trains include wheels arranged in line that is direction of travel, and where equipment is interspersed with wheels along said line.

\* \* \* \* \*